March 26, 1963   T. C. SCHAEFFER   3,082,524
ROTARY SAW BLADE
Filed Jan. 26, 1961

INVENTOR
Thomas C. Schaeffer
BY Robert K. Youtie
ATTORNEY

р3,082,524
ROTARY SAW BLADE
Thomas C. Schaeffer, 104 Thackara Ave., Berlin, N.J.
Filed Jan. 26, 1961, Ser. No. 85,134
1 Claim. (Cl. 30—347)

The instant invention relates generally to saws, and is especially concerned with circular saw blades having unique formation of teeth.

While the saw blade of the present invention has been primarily developed and employed in the cutting of asphalt-impregnated building board, such as that formed of wood chips, sugar-cane fiber, or the like, and sold under the trademark "Celotex," it is understood that the device of the instant invention is capable of many varied applications, all of which are intended to be comprehended herein.

As is well-known to those versed in the building arts, the cutting of asphalt-impregnated building boards, such as roofing materials, has heretofore presented serious difficulties. For example, the use of rotary power saws to effect such cutting was not entirely satisfactory, as the cutting action was relatively slow, and the saw blades quickly lost their effectiveness due to the generation of heat and consequent melting and sticking of asphalt. Thus, blade life was extremely short so that costs were high both for replacement blades, regrinding blades, and labor in the cutting and blade-replacement procedures.

Accordingly, it is an object of the present invention to provide a saw construction which overcomes the above-mentioned problems, being well-adapted for use in cutting asphalt-impregnated building board and similar materials at relatively high speed and for long periods of use between sharpenings. This, of course, is productive of substantial economies, both in labor and materials.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claim.

Figure 1:
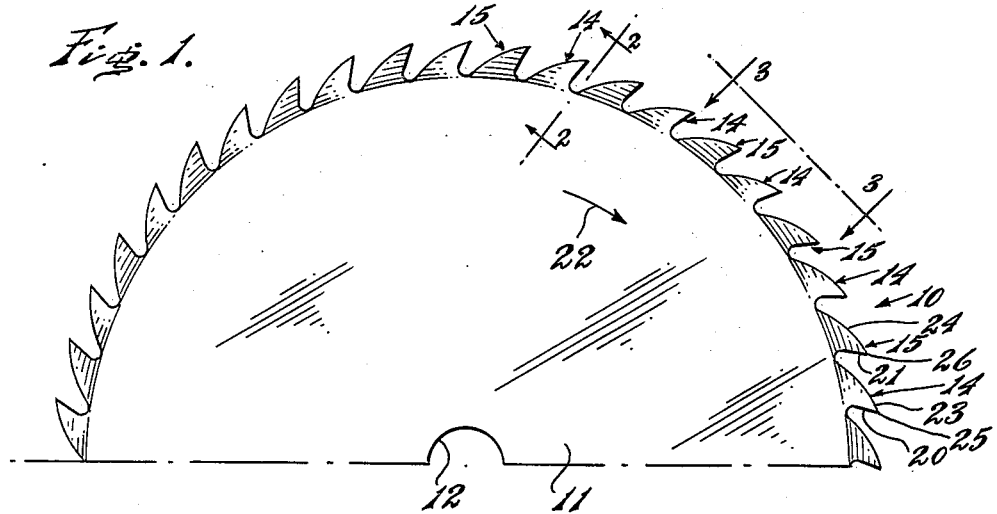
FIGURE 1 is a partial side elevation showing a rotary saw blade constructed in accordance with the teachings of the present invention.

Referring now more particularly to the drawings, the saw blade illustrated therein is generally designated 10, and includes a generally flat, substantially circular central portion 11, having a mounting hole 12. In the illustrated embodiment is shown a solid-tooth circular-saw-blade construction wherein the teeth are formed integral with and from the same material as the central region 11.

More specifically, a plurality of teeth project radially from the periphery of the central region 11, alternate teeth being generally designated 14, and the remaining, intermediate teeth being generally designated 15.

Figure 2:
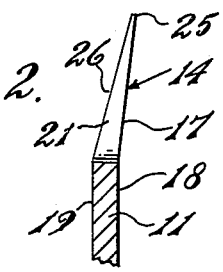
FIGURE 2 is a fragmentary sectional view taken substantially along the line 2—2 of FIGURE 1.
Figure 3:
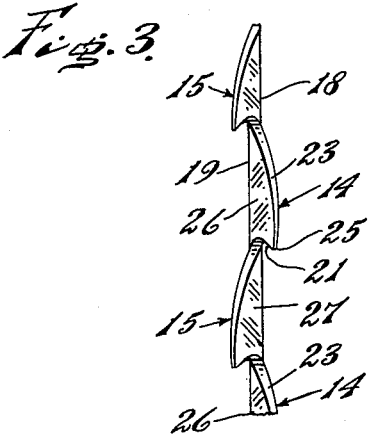
FIGURE 3 is a partial edge view taken substantially along the line 3—3 of FIGURE 1.

As best seen in FIGURE 3, each alternate tooth 14 is bent laterally outward, proximate to its root, to one side of the central region 11. As seen in FIGURE 2, a tooth 14 has been bent to extend radially outward from the central region 11, and obliquely laterally toward one side of the central region, the right-hand side as seen in the drawing. In the bent condition of tooth 14, the side surface 17 of the tooth defines an internal dihedral angle with the side surface 18 of central region 11 of approximately 169 degrees. The internal dihedral angle thus formed between surfaces 17 and 18 has its apex extending approximately along the root of tooth 14. The remaining teeth 15 intermediate the alternate teeth 14 are of similar radially and laterally outwardly obliquely extending disposition, but extend laterally outward on the opposite side of the central region 11 beyond the side surface 19 of the central region.

Each tooth 14 and 15 has its leading edge 20 and 21, respectively, undercut so as to extend radially outward and obliquely forward in the direction of blade rotation, as indicated by the arrow 22. The trailing edge 23, 24 of each tooth 14 and 15, respectively, extends radially outward and obliquely forward in the direction of blade rotation at a greater angle of inclination than the leading edges 20, 21, so as to respectively meet with the latter and define generally forwardly pointing apices 25 and 26. That is, the trailing edges 23 and 24 of the respective teeth 14 and 15 are longer than the leading edges 20 and 21 and incline at a greater angle to the radii than the leading edges. The leading edges 20 and 21 may be substantially straight, and the trailing edges 23 and 24 may be slightly convex.

The side surface 17 of each tooth 14 will hereinafter be called the outer side, as it is laterally outward of the central region 11. The opposite side surface 26 of each tooth 14 will hereinafter be called the inner side, as it is laterally inward of its adjacent side 19 of the central region 11. Further, as best seen in FIGURE 2, the inner side surface 26 is beveled flat so as to converge toward the outer side surface 17 in the radially outward direction. The inner side surface 26 is preferably beveled flat through a major portion of its length to its distal end or tip, and may be beveled flat from its root to its tip, as illustrated. As seen in FIGURE 3, the beveled surface 26 extends throughout the length of the tooth, intersecting with the forward and trailing edges 21 and 23 substantially throughout the length thereof. By the beveled configuration, the leading edge 21 tapers to the point 25, as does the trailing edge 23. Thus, the edges 21 and 23 are relatively sharp proximate to the tip 25, the latter being relatively pointed.

In practice, the blade 11 may be of the general order of .050 inch thick, say about 18-gauge, and tooth height may be approximately 5/16 inch. The angle of bevel of side 26 may be such as to produce a tip thickness at the point 25 of about .010 inch or less. The angle defined between surfaces 17 and 18, for a tooth height of about 5/16 inch, is such as to shift the tip 25 approximately 1/16 inch laterally outward beyond the surface 18.

The remaining teeth 15 are all substantially identical to the teeth 14, but the reverse thereof being bent to extend laterally outward beyond the surface 19 and having beveled inner surfaces 27 inward of the plate surface 18. The specific configuration and formation of teeth 15 may be substantially identical to that of teeth 14, as described hereinbefore.

Subsequent to formation and grinding of the teeth 14 as described, the teeth are preferably plated with wear-resistant material, such as chrome or the like, completely covering all surfaces of the teeth. That is, the cutting edges 20, 23, 21 and 24 are preferably chrome-plated, as well as the side faces of the teeth.

In practice, the saw-blade construction of the present invention has been found highly advantageous in maintaining a high cutting efficiency for a relatively long period of use, and being capable of regrinding about three times before it becomes necessary to refinish the beveled surfaces 26 and 27. While the beveled surfaces 26 and 27 each are shown extending from the root to the tip of its respective tooth, it is appreciated that these surfaces may extend less than the total tooth height but preferably at least 75% of the total tooth height to the tip.

From the foregoing, it is seen that the present invention provides a saw-blade construction which fully accomplishes its intended objects and is well-adapted to meet practical conditions of manufacture and use.

Although the present invention has been described in some detail by way of illustration and example for purposes of clarity of understanding, it is understood that certain changes and modifications may be made within the spirit of the invention and scope of the appended claim.

What is claimed is:

A rotary saw blade for cutting asphalt building board, said blade comprising a generally flat central region having side faces, and a plurality of teeth extending generally radially outward from said central region about the periphery thereof, each of said teeth being bent about a generally chordal line proximate to its root to extend obliquely laterally outward with adjacent teeth extending in opposite lateral directions appreciably beyond the adjacent side face, each tooth having its laterally outer side defining an internal dihedral angle with said central region of approximately 169 degrees with the vertex of the angle proximate to the root of the tooth, and each of said teeth having its laterally inner and outer sides substantially flat and converging generally from its root to its tip, said teeth each extending beyond the adjacent face of said central region approximately one-fifth the tooth height.

References Cited in the file of this patent

UNITED STATES PATENTS

| | | |
|---|---|---|
| 496,874 | Hallsey | May 9, 1893 |
| 2,117,586 | Willson | May 17, 1938 |
| 2,524,323 | Lloyd-Young | Oct. 3, 1950 |
| 2,791,248 | Beale | May 7, 1957 |
| 2,855,669 | Duke | Oct. 14, 1958 |